United States Patent
Kobayashi et al.

(10) Patent No.: US 11,482,234 B2
(45) Date of Patent: Oct. 25, 2022

(54) SOUND COLLECTION LOUDSPEAKER APPARATUS, METHOD AND PROGRAM FOR THE SAME

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/264,197

(22) PCT Filed: Jul. 29, 2019

(86) PCT No.: PCT/JP2019/029686
§ 371 (c)(1),
(2) Date: Jan. 28, 2021

(87) PCT Pub. No.: WO2020/027062
PCT Pub. Date: Feb. 6, 2020

(65) Prior Publication Data
US 2021/0304780 A1    Sep. 30, 2021

(30) Foreign Application Priority Data
Aug. 2, 2018   (JP) .............................. JP2018-145952

(51) Int. Cl.
*G10L 21/0208*   (2013.01)
*H04R 1/02*   (2006.01)

(52) U.S. Cl.
CPC ............ *G10L 21/0208* (2013.01); *H04R 1/02* (2013.01); *H04R 2410/01* (2013.01); *H04R 2499/13* (2013.01)

(58) Field of Classification Search
CPC .. H04R 1/02; H04R 2410/01; H04R 2499/13; G10L 21/0208
See application file for complete search history.

(56) References Cited

U.S. PATENT DOCUMENTS

| | | | |
|---|---|---|---|
| 8,824,697 B2* | 9/2014 | Christoph | H04R 3/005 381/86 |
| 2005/0265560 A1* | 12/2005 | Haulick | H04R 3/02 381/103 |

(Continued)

FOREIGN PATENT DOCUMENTS

JP    2012-195801 A    10/2012

OTHER PUBLICATIONS

"Technology of 'Intelligent microphone for car'", [online], 2018, Nippon Telegraph and Telephone Corporation, accessed May 24, 2018, Internet, Retrieved from: URL:http://www.ntt.co.jp/news2018/1802/pdf/180219c.pdf, with translation generated by machine.

*Primary Examiner* — Jason R Kurr

(57) ABSTRACT

A first noise level, which is an estimated value of a magnitude of a noise component included in a first sound collection signal obtained from a first microphone which collects sound emitted from a first sound collection and amplification position is obtained, a second noise level, which is an estimated value of a magnitude of a noise component included in a second sound collection signal obtained from a second microphone which collects sound emitted from a second sound collection and amplification position is obtained, a ratio of a reproduced noisy sound level, which is an estimated value of a magnitude of noise at a position of a passenger at the second sound collection and amplification position in a case where the first noise level is reproduced from a second speaker placed at the second sound collection and amplification position, with respect to a second noisy sound level, which is an estimated value of a magnitude of (Continued)

noise corresponding to the second noise level at the position of the passenger at the second sound collection and amplification position is obtained, and a noise suppression amount is obtained so that a product of this ratio and the noise suppression amount becomes a constant set in advance.

4 Claims, 15 Drawing Sheets

(56) References Cited

U.S. PATENT DOCUMENTS

2007/0280486 A1* 12/2007 Buck ............... H04S 7/301
381/92
2017/0011753 A1* 1/2017 Herbig ............... H04R 3/00

* cited by examiner

SOUND COLLECTION LOUDSPEAKER APPARATUS, METHOD AND PROGRAM FOR THE SAME

CROSS-REFERENCE TO RELATED APPLICATIONS

This application is a U.S. 371 Application of International Patent Application No. PCT/JP2019/029686, filed on 29 Jul. 2019, which application claims priority to and the benefit of JP Application No. 2018-145952, filed on 2 Aug. 2018, the disclosures of which are hereby incorporated herein by reference in their entireties.

TECHNICAL FIELD

The present invention relates to a sound collection and amplification technology for allowing smooth conversation inside a vehicle using a microphone and a speaker.

BACKGROUND ART

A function called in-car communication or conversation assist has been increasingly mounted on automobiles (see Non-patent literature 1). This function collects voice of a person who sits in a front seat with a microphone 91F and reproduces the voice from a speaker 92R at a back seat so as to make it easier for passengers to hold a conversation (see FIG. 1). Additionally, there is also a function which collects voice on the back seat with a microphone 91R and reproduces the voice from a speaker 92F at the front seat.

In in-car communication, in a case where sound collected with a microphone is reproduced as is from a speaker, noisy sound such as driving sound is also reproduced from the speaker along with speech, and noisy sound comes from the speaker. This is prevented by noise suppression.

In related art, noise is suppressed with a noise suppression amount set in advance (see FIG. 2). For example, a noise suppressing part 94F receives a suppression amount set at a suppression amount setting part 93F, multiplies a sound collection signal which is a signal of sound collected with the microphone 91R by the suppression amount, and outputs a result to the speaker 92F.

PRIOR ART LITERATURE

Non-Patent Literature

Non-patent literature 1: "Technology of 'Intelligent microphone for car'", [online], 2018, Nippon Telegraph and Telephone Corporation, accessed May 24, 2018, Internet, Retrieved from: UREhttp://www.ntt.co.jp/news2018/1802/pdf/180219c.pdf

SUMMARY OF THE INVENTION

Problems to be Solved by the Invention

However, with the structure in the related art, in a case where noisy sound on the microphone 91R side is large, and noisy sound on the speaker 92F side is small, there is a case where noise is not suppressed enough to make noisy sound to be output from the speaker 92F imperceptible. Further, in a case where noisy sound on the microphone 91R side is small, and noisy sound on the speaker 92F side is large, there is a case where noise is too suppressed, so that speech degradation is perceived. When noisy sound increases by introduction of this system, noisy sound continues to increase while users are not holding a conversation, which significantly lowers users' evaluation. In other words, when noisy sound from the speaker is perceived by introduction of this system, if sound collected with a remote microphone is subjected to signal processing while there is no speech signal, noisy sound is increased, which significantly lowers users' evaluation. The present invention is therefore directed to achieving a state where sound quality does not degrade most under prerequisite conditions that noise output from the speaker is made smaller to at least a degree at which a user does not perceive that noise comes from the speaker, or to a degree at which the user does not care noise output from the speaker even if the user perceives the noise. A human is less likely to notice degradation of a speech signal if ambient noise is great, but is likely to notice degradation of a speech signal if ambient noise is small. In other words, the present invention is directed to performing stronger noise suppression on sound collected at a remote place as ambient noise is greater, and performing weaker noise suppression on sound collected at a remote place as ambient noise is smaller to thereby perform noise suppression for each listening position so that a human is less likely to notice degradation of speech even in an automobile in which ambient noise is often different depending on the listening position.

The present invention is directed to providing a sound collection loudspeaker apparatus which is capable of setting an appropriate noise suppression amount in accordance with noisy sound levels on a microphone side and on a speaker side, a method and a program for the sound collection loudspeaker apparatus.

Means to Solve the Problems

To solve the above-described problem, according to one aspect of the present invention, a sound collection loudspeaker apparatus is mounted on a vehicle in which at least a first sound collection and amplification position and a second sound collection and amplification position are assumed to be located inside the vehicle. The sound collection loudspeaker apparatus includes a first noise level estimating part configured to obtain a first noise level, which is an estimated value of a magnitude of a noise component included in a first sound collection signal obtained from a first microphone which collects sound emitted from the first sound collection and amplification position, a second noise level estimating part configured to obtain a second noise level, which is an estimated value of a magnitude of a noise component included in a second sound collection signal obtained from a second microphone which collects sound emitted from the second sound collection and amplification position, a suppression amount setting part configured to obtain a ratio of a reproduced noisy sound level, which is an estimated value of a magnitude of noise at a position of a passenger at the second sound collection and amplification position in a case where the first noise level is reproduced from a second speaker placed at the second sound collection and amplification position, with respect to a second noisy sound level, which is an estimated value of a magnitude of noise corresponding to the second noise level at a position of a passenger at the second sound collection and amplification position, and obtain a noise suppression amount so that a product of this ratio and the noise suppression amount becomes a constant set in advance, and a noise suppressing part configured to multiply the first sound collection signal by the noise suppression amount and output a multiplication result to the second speaker placed at the second sound collection and amplification position.

To solve the above-described problem, according to another aspect of the present invention, a sound collection loudspeaker apparatus is mounted on a vehicle in which at least a first sound collection and amplification position and a second sound collection and amplification position are assumed to be located inside the vehicle. The sound collection loudspeaker apparatus includes a first noise level estimating part configured to obtain a first noise level, which is an estimated value of a magnitude of a noise component included in a first sound collection signal obtained from a first microphone which collects sound emitted from the first sound collection and amplification position, a suppression amount setting part configured to obtain a noise suppression amount so that a product of a reproduced noisy sound level and the noise suppression amount becomes a constant set in advance, the reproduced noisy sound level being an estimated value of a magnitude of noise at a position of a passenger at the second sound collection and amplification position in a case where the first noise level is reproduced from a second speaker placed at the second sound collection and amplification position, and a noise suppressing part configured to multiply the first sound collection signal by the noise suppression amount and output a multiplication result to the second speaker placed at the second sound collection and amplification position.

To solve the above-described problem, according to another aspect of the present invention, a sound collection loudspeaker apparatus is mounted on a vehicle in which at least a first sound collection and amplification position and a second sound collection and amplification position are assumed to be located inside the vehicle. The sound collection loudspeaker apparatus includes a first noise level estimating part configured to obtain a first noise level, which is an estimated value of a magnitude of a noise component included in a first sound collection signal obtained from a first microphone which collects sound emitted from the first sound collection and amplification position, from at least one of (i) a volume of an in-vehicle acoustic apparatus mounted on the vehicle, (ii) a setting value of air-conditioning equipment mounted on the vehicle, or (iii) traveling speed of the vehicle, a noise level estimating part configured to obtain a second noise level, which is an estimated value of a magnitude of a noise component included in a second sound collection signal obtained from a second microphone which collects sound emitted from the second sound collection and amplification position, from at least one of (i) the volume of the in-vehicle acoustic apparatus mounted on the vehicle, (ii) the setting value of the air-conditioning equipment mounted on the vehicle, or (iii) the traveling speed of the vehicle, and a suppression amount setting part configured to obtain a ratio of a reproduced noisy sound level, which is an estimated value of a magnitude of noise at a position of a passenger at the second sound collection and amplification position in a case where the first noise level is reproduced from a second speaker placed at the second sound collection and amplification position, with respect to a second noisy sound level, which is an estimated value of a magnitude of noise corresponding to the second noise level at the position of the passenger at the second sound collection and amplification position, and obtain a noise suppression amount so that a product of this ratio and the noise suppression amount becomes a constant set in advance, and a noise suppressing part configured to multiply the first sound collection signal by the noise suppression amount and output a multiplication result to the second speaker placed at the second sound collection and amplification position.

To solve the above-described problem, according to another aspect of the present invention, a sound collection loudspeaker apparatus is mounted on a vehicle in which at least a first sound collection and amplification position and a second sound collection and amplification position are assumed to be located inside the vehicle. The sound collection loudspeaker apparatus includes a first noise level estimating part configured to obtain a first noise level, which is an estimated value of a magnitude of a noise component included in a first sound collection signal obtained from a first microphone which collects sound emitted from the first sound collection and amplification position, from at least one of (i) a volume of an in-vehicle acoustic apparatus mounted on the vehicle, (ii) a setting value of air-conditioning equipment mounted on the vehicle, or (iii) traveling speed of the vehicle, a suppression amount setting part configured to obtain a noise suppression amount so that a product of a reproduced noisy sound level and the noise suppression amount becomes a constant set in advance, the reproduced noisy sound level being an estimated value of a magnitude of noise at a position of a passenger at the second sound collection and amplification position in a case where the first noise level is reproduced from a second speaker placed at the second sound collection and amplification position, and a noise suppressing part configured to multiply the first sound collection signal by the noise suppression amount and output a multiplication result to the second speaker placed at the second sound collection and amplification position.

To solve the above-described problem, according to another aspect of the present invention, a sound collection loudspeaker apparatus is mounted on a vehicle in which at least a first sound collection and amplification position and a second sound collection and amplification position are assumed to be located inside the vehicle. The sound collection loudspeaker apparatus includes a noise suppressing part configured to suppress noise included in a first sound collection signal obtained from a first microphone which collects sound emitted from the first sound collection and amplification position, and a second noise level acquiring part configured to acquire a second noise level, which is a magnitude of a noise component included in a second sound collection signal obtained from a second microphone which collects sound emitted from the second sound collection and amplification position, and the noise suppressing part suppresses noise using a suppression amount which becomes greater as the second noise level becomes greater and which becomes smaller as the second noise level becomes smaller.

Effects of the Invention

According to the present invention, it is possible to provide effects of enabling setting of an appropriate noise suppression amount.

DETAILED DESCRIPTION OF THE EMBODIMENTS

Figure 1:
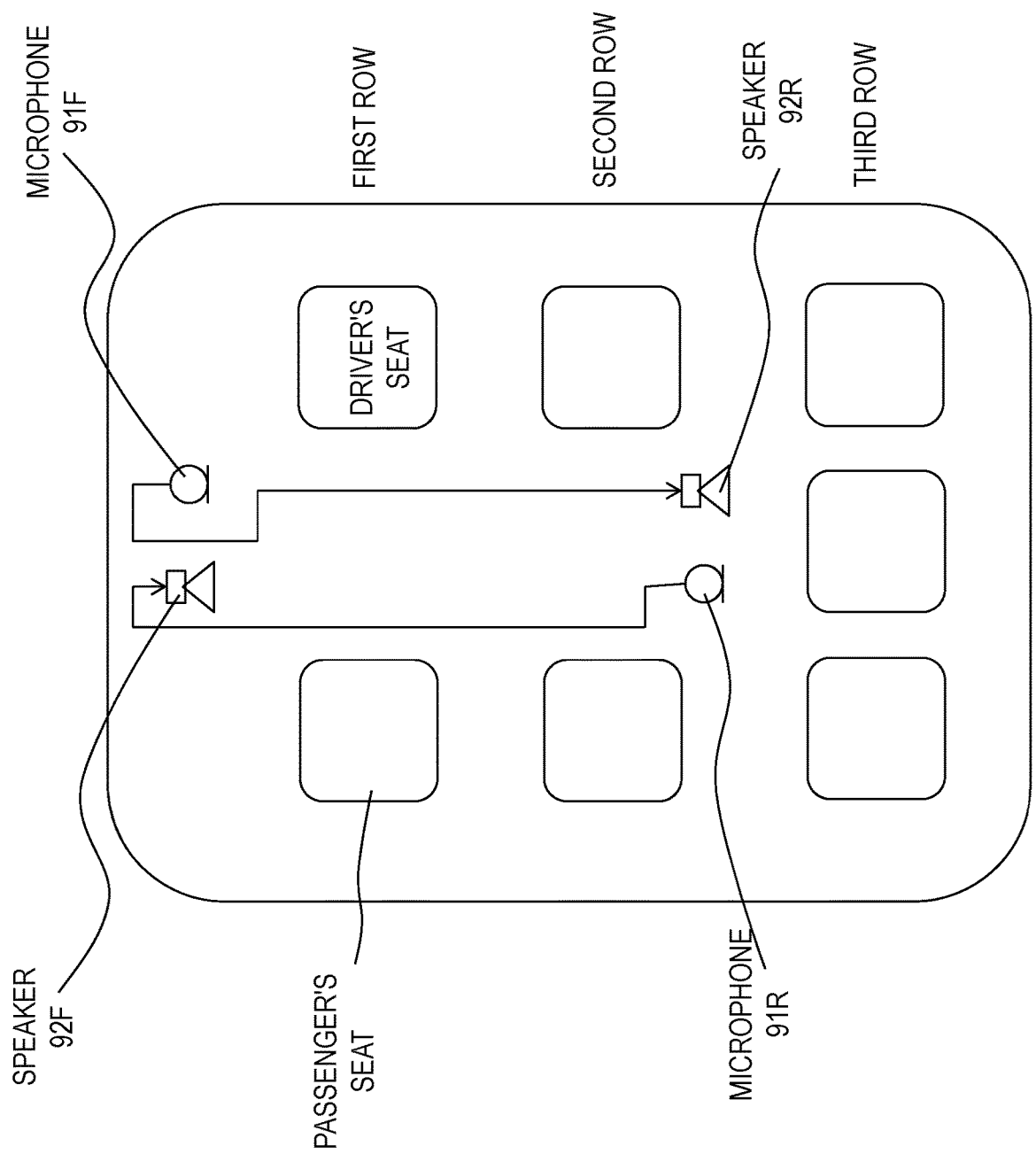
FIG. 1 is a view for explaining a vehicle of the present embodiment.
Figure 2:
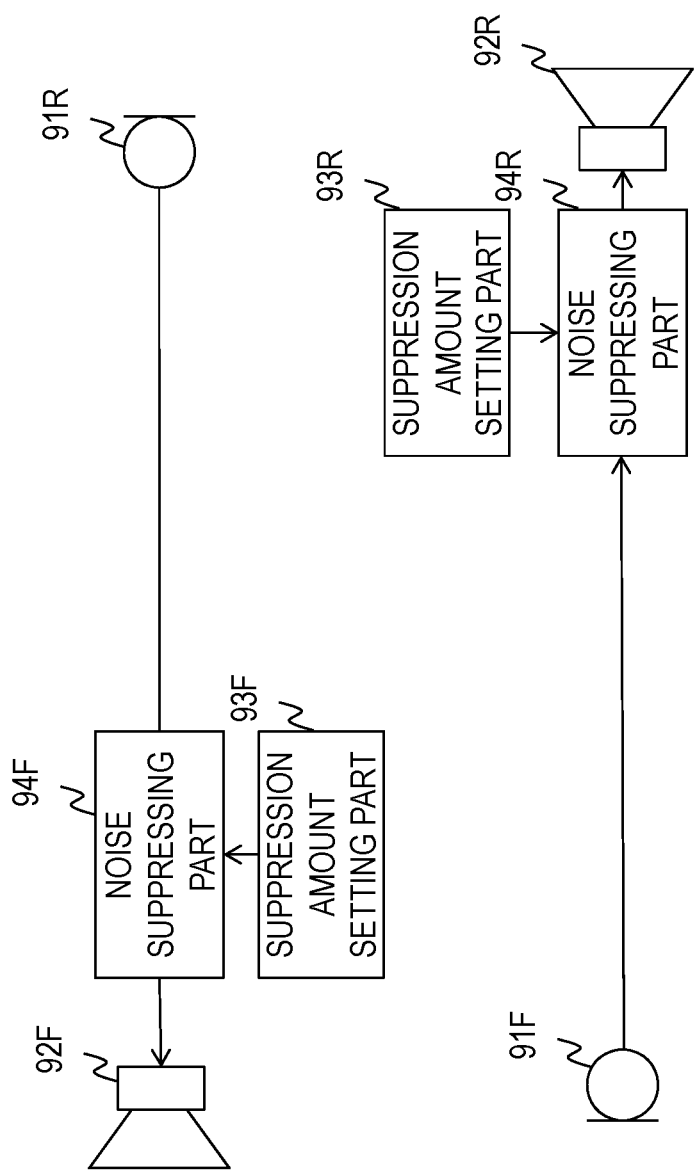
FIG. 2 is a view for explaining related art.

Embodiments of the present invention will be described below. Note that the same reference numerals will be assigned to components having the same functions and steps of performing the same processing in the drawings used for the following description, and overlapped description will be omitted. In the following description, processing performed in unit of each element of a vector and a matrix is applied to all elements of the vector and the matrix unless otherwise specified.

First Embodiment

Figure 3:
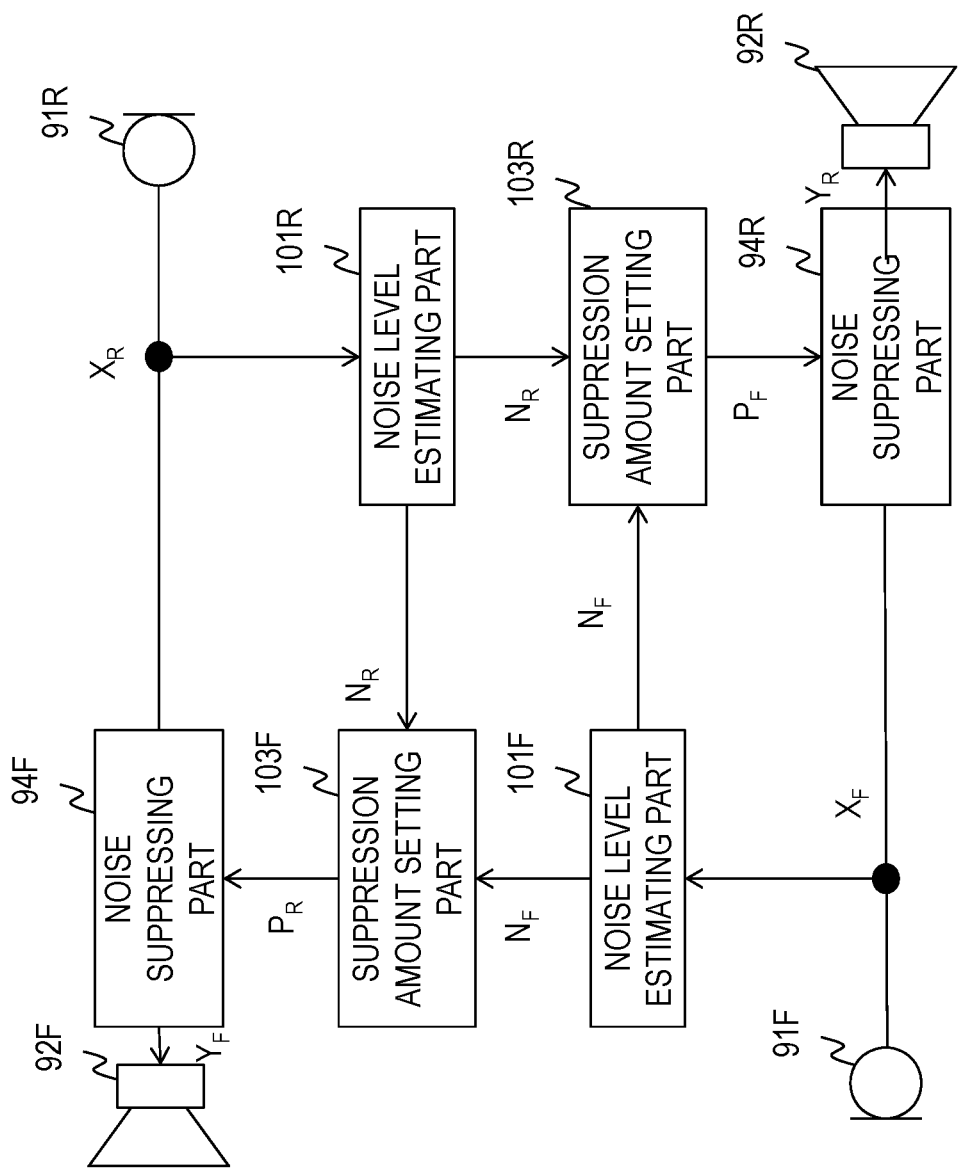
FIG. 3 is a functional block diagram of a sound collection loudspeaker apparatus according to a first embodiment.
Figure 4:
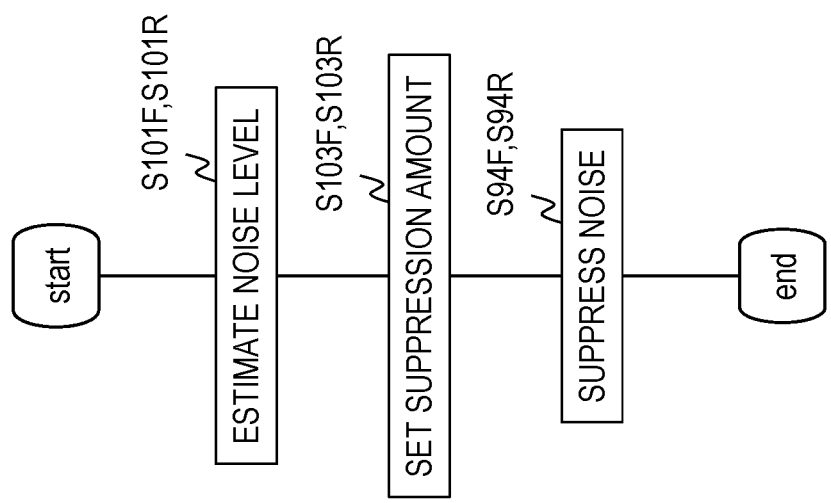
FIG. 4 is a view illustrating an example of processing flow of the sound collection loudspeaker apparatus according to the first embodiment.

FIG. 3 is a functional block diagram of a sound collection loudspeaker apparatus according to a first embodiment, and FIG. 4 illustrates processing flow of the sound collection loudspeaker apparatus.

The sound collection loudspeaker apparatus includes noise level estimating parts 101F and 101R, suppression amount setting parts 103F and 103R, and noise suppressing parts 94F and 94R.

The sound collection loudspeaker apparatus receives input of sound collection signals $X_F$ and $X_R$ obtained from microphones 91F and 91R, suppresses noise components included in the sound collection signals $X_F$ and $X_R$ to generate reproduction signals $Y_R$ and $Y_F$ and outputs the reproduction signals $Y_R$ and $Y_F$ to speakers 92R and 92F. Note that the signals $X_F$, $X_R$, $Y_F$ and $Y_R$ are expressed with complex numbers of frequency components of the respective signals. Here, the signals $X_F$, $X_R$, $Y_F$ and $Y_R$ in a frequency domain may be input/output as is, or signals in a time domain which are input may be transformed (for example, subjected to Fourier transform, or the like) into the signals $X_F$ and $X_R$ in a frequency domain at a frequency domain transforming part which is not illustrated and used, or the signals $Y_F$ and $Y_R$ in a frequency domain may be transformed (for example, subjected to inverse Fourier transform, or the like) into signals in a time domain at a time domain transforming part which is not illustrated and output.

In the present embodiment, a vehicle on which the sound collection loudspeaker apparatus is to be mounted has a structure as illustrated in FIG. 1 and includes seats of three rows. Further, the vehicle of the present embodiment includes a microphone 91F which mainly collects speech of a speaker on a first row, and a microphone 91R which mainly collects speech of a speaker on a third row. Each of the microphones 91F and 91R includes M microphones. Note that F and R are indexes respectively indicating forward and backward with respect to a traveling direction of the vehicle. Further, the vehicle of the present embodiment includes a speaker 92F which reproduces sound to a listener on a seat on a first row, and a speaker 92R which reproduces sound to a listener on a seat on a third row. Each of the speakers 92F and 92R includes N speakers. However, N is any integer of 1 or greater and indicates the number of channels of the reproduction signal.

The sound collection loudspeaker apparatus is, for example, a special apparatus which is constituted by a special program being loaded to a publicly known or dedicated computer including a central processing unit (CPU), a main storage apparatus (random access memory: RAM), and the like. The sound collection loudspeaker apparatus, for example, executes respective kinds of processing under control by the central processing unit. Data input to the sound collection loudspeaker apparatus and data obtained through the respective kinds of processing are, for example, stored in the main storage apparatus, and the data stored in the main storage apparatus is read out to the central processing unit as necessary and utilized for other processing. At least part of respective processing parts of the sound collection loudspeaker apparatus may be constituted with hardware such as an integrated circuit. The respective storage parts of the sound collection loudspeaker apparatus can be constituted with, for example, a main storage apparatus such as a random access memory (RAM), and middleware such as a relational database and a key value store. However, the sound collection loudspeaker apparatus does not necessarily have to include the respective storage parts inside, and the respective storage parts may be constituted with an auxiliary storage apparatus which is constituted with a hard disk, an optical disk or a semiconductor memory device such as a flash memory, and may be provided outside the sound collection loudspeaker apparatus.

The respective parts will be described below.

<Noise Level Estimating Parts 101F, 101R>

The noise level estimating part 101F receives input of a sound collection signal $X_F$, obtains a noise level $N_F$ which is an estimated value of a magnitude of a noise component included in the sound collection signal $X_F$ (S101F) and outputs the noise level $N_F$. Hereinafter, the sound collection signal $X_F$ and the noise level $N_F$ will be respectively expressed as $X_F(\omega, n)$ and $N_F(\omega, n)$ to clearly specify processing for each frequency and processing for each frame. Note that w indicates a frequency and n indicates a frame number.

Figure 5:
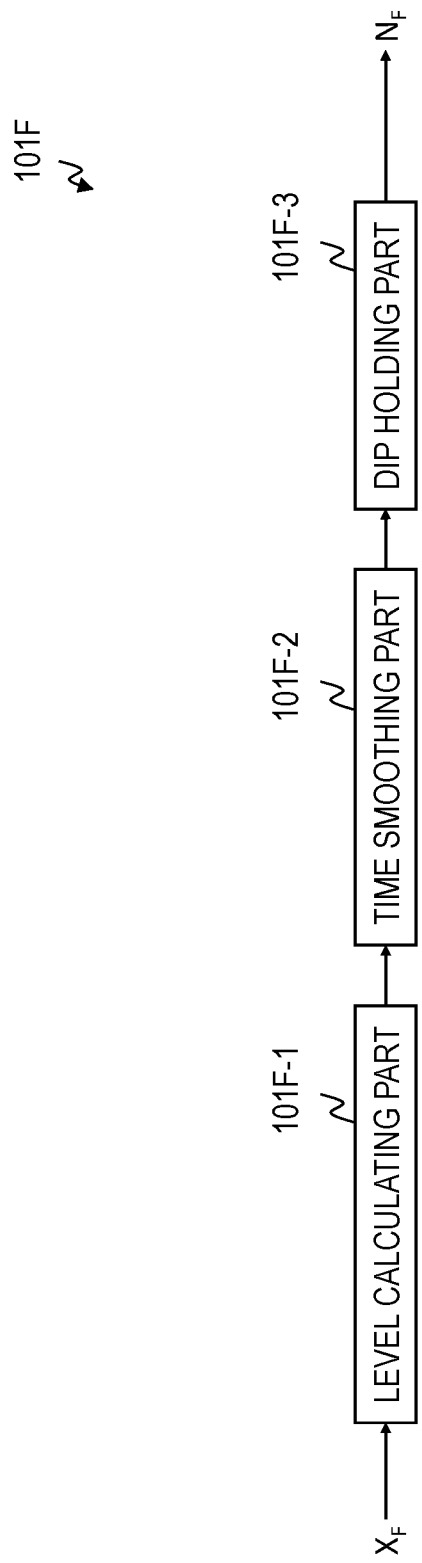
FIG. 5 is a functional block diagram of a noise level estimating part according to the first embodiment.

FIG. 5 illustrates a more specific functional configuration example of the noise level estimating part 101F. The noise level estimating part 101F includes a level calculating part 101F-1, a time smoothing part 101F-2 and a dip holding part 101F-3.

The level calculating part 101F-1 obtains a magnitude of the sound collection signal $X_F(\omega, n)$. The magnitude is an absolute value $|X_F(\omega, n)|$ of the sound collection signal $X_F(\omega, n)$ or power $|X_F(\omega, n)|^2$ of the sound collection signal $X_F(\omega, n)$, and the level calculating part 101F-1 obtains at least one of the values through calculation. The magnitude is a value which may be referred to as a level.

The time smoothing part 101F-2 then calculates a sound collection signal level $Z_F(\omega, n)$ obtained by time smoothing the level of the sound collection signal expressed with an absolute value or power (expression (1) or expression (2)). $\alpha$ in expression (1) and (2) is a smoothing coefficient and assumes a value equal to or greater than 0 and less than 1. Smoothing is performed for a longer period as the smoothing coefficient becomes closer to 1.

$$Z_F(\omega,n)=\alpha Z_F(\omega,n-1)+(1-\alpha)|X_F(\omega,n)| \quad (1)$$

or $$Z_F(\omega,n)=\alpha Z_F(\omega,n-1)+(1-\alpha)|X_F(\omega,n)|^2 \quad (2)$$

The dip holding part 101F-3 performs dip holding processing of holding a minimum value indicated in, for example, the following expression, on the time-smoothed sound collection signal $Z_F(\omega, n)$ to obtain a noise level $N_F(\omega, n)$.

$$N_F(\omega,n)=Z(\omega,n) \text{ for } N_F(\omega,n-1)\geq Z(\omega,n)$$

$$N_F(\omega,n)=uZ(\omega,n-1) \text{ for } N_F(\omega,n-1)<Z(\omega,n)$$

In a case where a noise level $N_F(\omega, n-1)$ of a frame one frame before the frame is greater than the time-smoothed sound collection signal level $Z(\omega, n)$, the time-smoothed sound collection signal level $Z(\omega, n)$ is assigned to a noise level $N_F(\omega, n)$ to be estimated, otherwise, the noise level is slightly raised by the noise level $N_F(\omega, n-1)$ of the frame one frame before the frame being multiplied by a constant u which is equal to or greater than 1. The constant u is set in advance. u is a rise coefficient of the noise level, and the noise level rises more moderately as the rise coefficient becomes closer to 1.

In a similar manner, the noise level estimating part 101R receives input of the sound collection signal $X_R(\omega, n)$, obtains the noise level $N_R(\omega, n)$ which is an estimated value of a magnitude of a noise component included in the sound collection signal $X_R$ (S101R), and outputs the noise level $N_R(\omega, n)$.

<Suppression Amount Setting Parts 103R, 103F>

Figure 6:
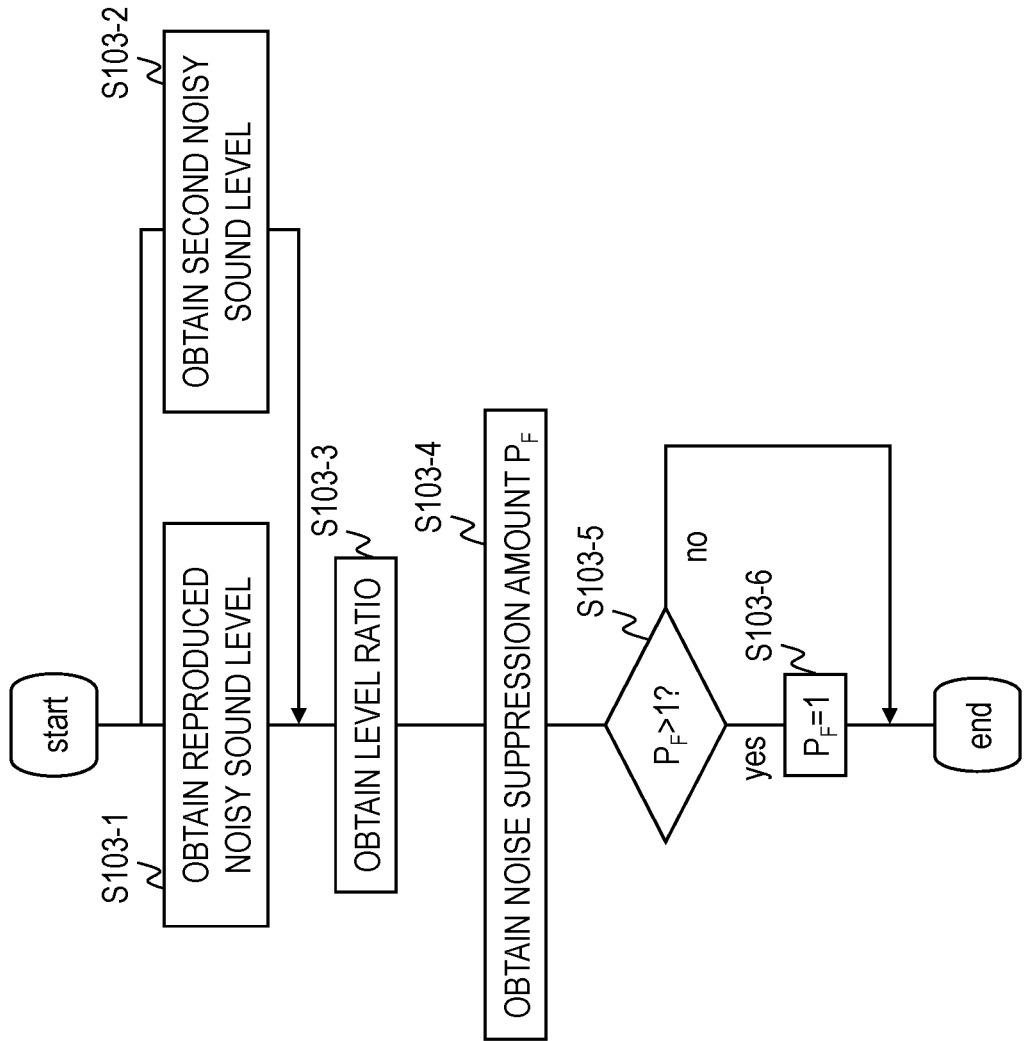
FIG. 6 is a view illustrating an example of processing flow of a suppression amount setting part according to the first embodiment.

The suppression amount setting part 103R receives input of the noise levels $N_F(\omega, n)$ and $N_R(\omega, n)$. The suppression amount setting part 103R performs the following processing to obtain a noise suppression amount $P_F$ (S103R) and outputs the noise suppression amount $P_F$. FIG. 6 illustrates an example of processing flow of the suppression amount setting parts 103R and 103F.

(1) The suppression amount setting part 103R calculates a noisy sound level (hereinafter, also referred to as a reproduced noisy sound level) which is an estimated value of a magnitude of noise at a listening position in a case where noisy sound collected on the microphone 91F side is reproduced from the speaker 92R as is. This can be obtained by multiplying the noise level $N_F(\omega, n)$ by a constant obtained in advance through measurement, or the like. For example, a microphone which is not illustrated is set on a back seat, a signal at a known volume is reproduced from the speaker 92R, and the reproduced sound is collected with the microphone. Note that the microphone which is not illustrated is placed, for example, at a position corresponding to the listening position on the back seat. Then, a ratio between the known volume and a volume of the collected signal is obtained as a constant. In other words, the suppression amount setting part 103R obtains a reproduced noisy sound level, which is an estimated value of a magnitude of noise at a position of a passenger on the back seat in a case where the noise level $N_F(\omega, n)$ is reproduced from the speaker 92R (S103-1).

(2) The suppression amount setting part 103R multiplies the noise level $N_R(\omega, n)$ obtained from the sound collection signal $X_R(\omega, n)$ of the microphone 91R placed on the speaker 92R side by a constant obtained in advance through measurement, or the like, to obtain a second noisy sound level. For example, a microphone which is not illustrated is provided on the back seat, an acoustic signal corresponding to noise is generated, and reproduced sound is collected with the microphone 91R and the microphone which is not illustrated. Note that the acoustic signal corresponding to noise is generated from an assumed noise source position. Then, a ratio of a volume of a signal collected with the microphone 91R and a volume of a signal collected with the microphone which is not illustrated is obtained as a constant. This ratio is obtained to perform correction because a noise level at a microphone for transmission is different from a noise level at the listening position. Note that the volume of the acoustic signal corresponding to noise only requires to be set at an appropriate volume to obtain the ratio, and the acoustic signal corresponding to noise may be reproduced from the speaker, or noise may be generated by causing a vehicle to actually travel, by bringing air-conditioning equipment (such as an air conditioner) into operation, or by reproducing music from a speaker of an in-vehicle acoustic apparatus (such as a car audio apparatus). In other words, the suppression amount setting part 103R obtains a second noisy sound level, which is an estimated value of a magnitude of noise corresponding to the noise level $N_R(\omega, n)$ at a position of a passenger on the back seat (S103-2).

(3) The suppression amount setting part 103R obtains a ratio of the reproduced noisy sound level with respect to the second noisy sound level (reproduced noisy sound level/second noisy sound level) (S103-3).

(4) The suppression amount setting part 103R obtains the noise suppression amount $P_F$ so that a product of this ratio and the noise suppression amount $P_F$ becomes a constant A (constant equal to or less than 1.0) set in advance (S103-4). In other words, the suppression amount setting part 103R obtains the noise suppression amount $P_F$ using the following expression.

$$P_F = A \times \text{second noisy sound level/reproduced noisy sound level}$$

As can be known from this expression, the noise suppression amount $P_F$ becomes greater as the second noisy sound level becomes greater, and becomes smaller as the second noisy sound level becomes smaller. Note that the second noisy sound level is a value obtained by multiplying the noise level $N_R(\omega, n)$ by a constant obtained in advance through measurement, or the like, and thus, it can be said that the noise suppression amount $P_F$ becomes greater as the noise level $N_R(\omega, n)$ becomes greater, and becomes smaller as the noise level $N_R(\omega, n)$ becomes smaller.

(5) In a case where $P_F$ is greater than 1 (S103-5), noise suppression is not required, and thus $P_F$ is set at 1 (S103-6).

The noise suppression amount $P_F(n)$ may be obtained from an overall noisy sound level (sum of noisy sound levels for each frequency) or the noise suppression amount $P_F(\omega, n)$ for each frequency may be obtained from a noisy sound level of each frequency. In the present embodiment, it is assumed that the noise suppression amount $P_F(\omega, n)$ for each frequency is obtained.

In a similar manner, the suppression amount setting part 103F receives input of noise levels $N_R(\omega, n)$ and $N_F(\omega, n)$, performs similar processing while swapping relationship between the front seat and the back seat to obtain a noise suppression amount $P_R$ (S103F), and outputs the noise suppression amount $P_R$.

A human is less likely to perceive noise which is amplified from the speaker as ambient noise (generated from an ambient environment, not emitted from the speakers 92F and 92R) (hereinafter, also referred to as ambient noise) is greater. Thus, in the present embodiment, ambient noise on the speaker (for example, the speaker 92R) side which emits sound is estimated, which level of noise (included in reproduced sound of the speaker 92R) is not perceived by a human is estimated, and a noise suppression amount is estimated based on a suppression amount of second ambient noise generated from the circumference of the microphone (for example, the microphone 91F) which collects sound emitted from the speaker (for example, the speaker 92F), so as to achieve a level of noise not perceived by a human (noise included in the reproduced sound of the speaker 92R). In short, the ambient noise on the speaker 92R side and the second ambient noise on the microphone 91F side are input, and a level of noise which is caused by the second ambient noise and which is not perceived by a human is obtained.

<Noise Suppressing Parts 94F and 94R>

The noise suppressing part 94R receives input of the sound collection signal $X_F(\omega, n)$ and the noise suppression amount $P_F(\omega, n)$, obtains a reproduction signal $Y_R(\omega, n) = P_F(\omega, n) X_F(\omega, n)$ by multiplying the sound collection signal $X_F(\omega, n)$ by the noise suppression amount $P_F(\omega, n)$ and outputs the reproduction signal $Y_R(\omega, n)$ to the speaker 92R.

In a similar manner, the noise suppressing part 94F receives input of the sound collection signal $X_R(\omega, n)$ and the noise suppression amount $P_R(\omega, n)$, obtains a reproduction signal $Y_F(\omega, n) = P_R(\omega, n) X_R(\omega, n)$ and outputs the reproduction signal $Y_F(\omega, n)$ to the speaker 92F.

The speaker 92R and 92F respectively reproduce the reproduction signals $Y_R(\omega, n)$ and $Y_F(\omega, n)$.

<Effects>

The above-described configuration enables setting of an appropriate noise suppression amount. For example, it is possible to suppress noise to a level at which noise to be reproduced from a speaker cannot be perceived at the listening position, while avoiding unnecessary speech degradation due to excessive suppression.

In other words, an appropriate noise suppression amount satisfies as far as possible two conflicting requests of (1) reducing a suppression amount of noise because sound is further from original sound as the noise suppression amount is made greater, and (2) removing noise as much as possible because noise emitted from the speaker brings a feeling of discomfort. Further, use of bidirectional systems (the microphone 91R and the speaker 92F, and the microphone 91F and the speaker 92R), noisy sound at the listening position can be observed for both systems without providing a new microphone. Further, unlike with a telephone, and the like, noise is continuously observed even while users are not holding a conversation, so that it is possible to suppress noise in accordance with tolerance of a user which changes in accordance with a difference of noisy sound.

Modified Examples

In the present embodiment, a configuration is employed where a vehicle includes seats of three rows, and microphones and speakers are provided on the first row and the third row because voice easily reaches and in-vehicle communication is not required in most cases between a seat on the first row and a seat on the second row, and between a seat on the third row and a seat on the second row. However, the present embodiment does not exclude a configuration where a microphone and a speaker are provided on the second row, and the microphone and the speaker may be provided as necessary. Further, the present embodiment may be applied to a vehicle including seats of two rows or seats of four or more rows, as well as a vehicle including seats of three rows. In short, it is only necessary to apply the present embodiment to a case where each other's voice is hard to hear at a normal volume of conversation due to driving sound, reproduced sound of a car audio, other noisy sound outside a vehicle, and the like, in a common acoustic field inside the vehicle.

Figure 7:
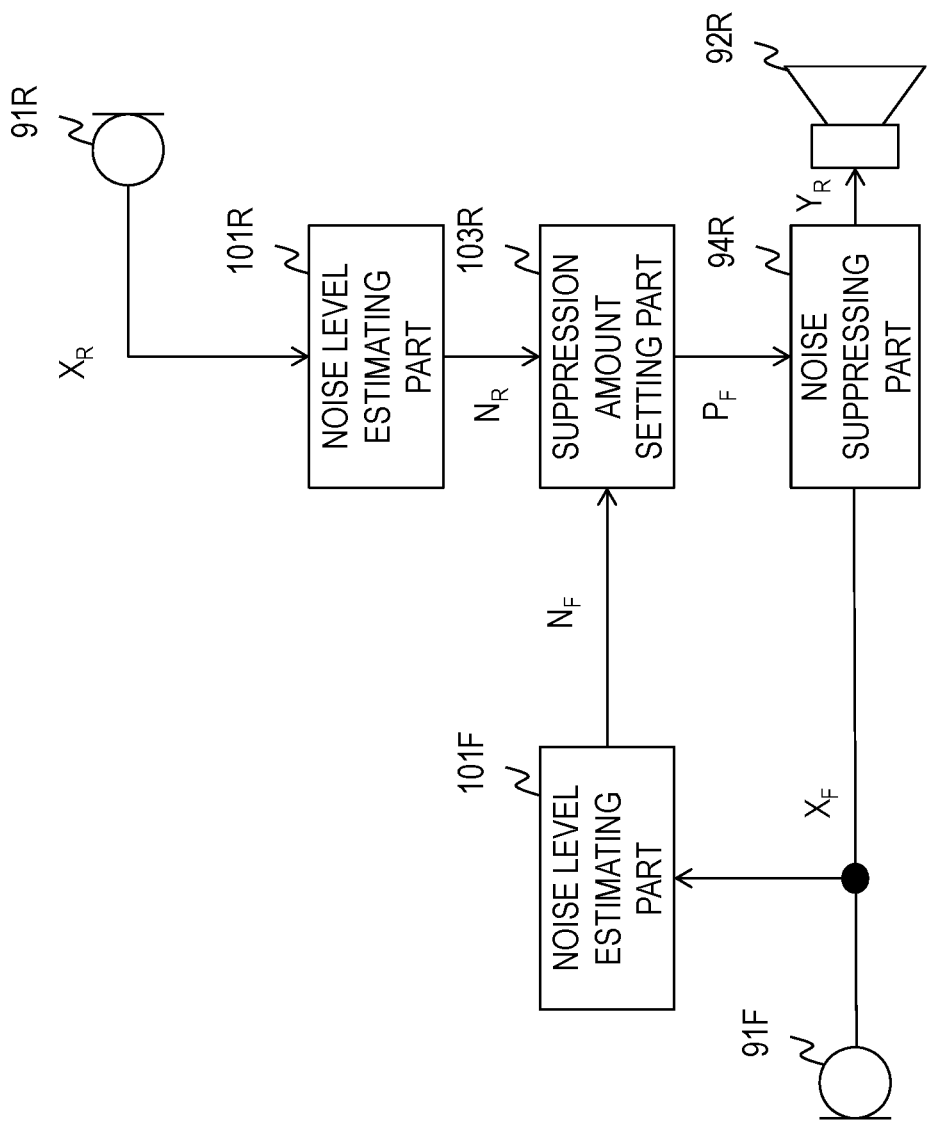
FIG. 7 is a functional block diagram of a sound collection loudspeaker apparatus according a modified example of the first embodiment.

While, in the present embodiment, bidirectional sound collection and amplification processing is performed between the front seat and the back seat, the sound collection and amplification processing of the present embodiment can be also applied to unidirectional processing. For example, FIG. 7 illustrates a functional block diagram of a sound collection loudspeaker apparatus in a case of a configuration where a signal collected at the front seat is amplified and reproduced at the back seat. Processing to be performed by the respective parts (the noise level estimating parts 101F and 101R, the suppression amount setting part 103R and the noise suppressing part 94R) is as described in the first embodiment, and thus description will be omitted. Such a configuration also enables setting of an appropriate noise suppression amount at the noise suppressing part 94R.

While, in the present embodiment, the noise level is estimated at the noise level estimating part within the sound collection loudspeaker apparatus, the noise level estimated at a noise level estimating apparatus outside the sound collection loudspeaker apparatus may be input to the sound collection loudspeaker apparatus. At this time, the noise level may be estimated using a sound collection signal of a microphone separately provided for estimating the noise level, instead of using the sound collection signals obtained from the microphones 91F and 91R. The suppression amount setting part will be also referred to as a noise level acquiring part because the suppression amount setting part acquires the noise level estimated at the noise level estimating apparatus outside the sound collection loudspeaker apparatus.

Second Embodiment

Portions different from the first embodiment will be mainly described.

In the present embodiment, the noise suppression amount is set from only a noisy sound level on one microphone (for example, the microphone 91F) side.

Figure 8:
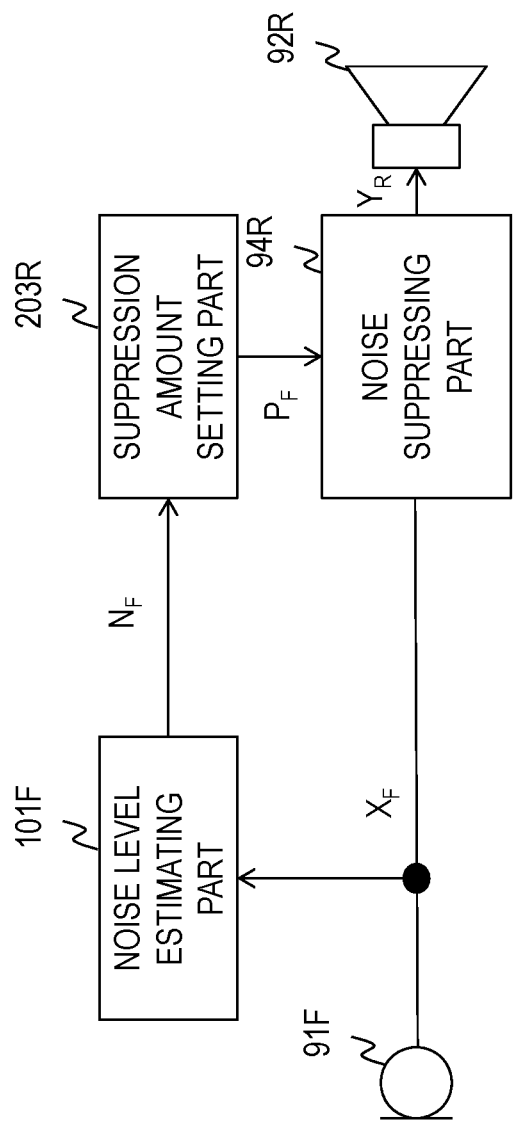
FIG. 8 is a functional block diagram of a sound collection loudspeaker apparatus according to a second embodiment.
Figure 9:
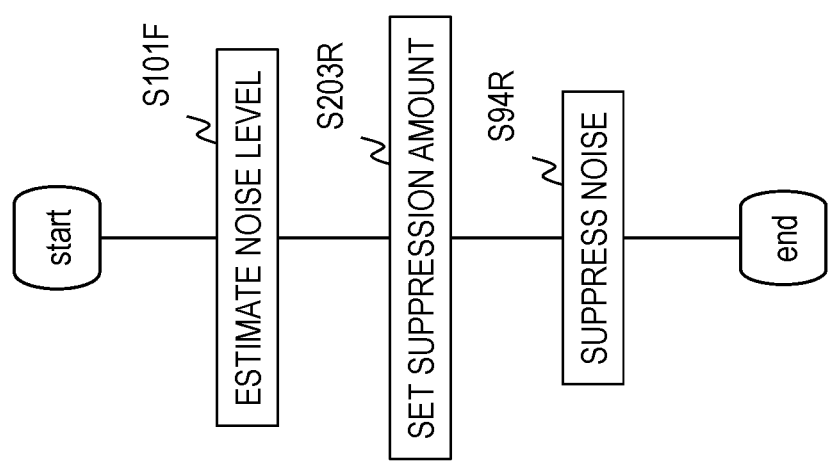
FIG. 9 is a view illustrating an example of processing flow of the sound collection loudspeaker apparatus according to the second embodiment.

FIG. 8 illustrates functional block diagram of a sound collection loudspeaker apparatus according to the second embodiment, and FIG. 9 illustrates processing flow of the sound collection loudspeaker apparatus.

The sound collection loudspeaker apparatus includes a noise level estimating part 101F, a suppression amount setting part 203R and a noise suppressing part 94R.

The sound collection loudspeaker apparatus receives input of a sound collection signal $X_F$ obtained from the microphone 91F, suppresses a noise component included in the sound collection signal $X_F$ to generate a reproduction signal $Y_R$ and outputs the reproduction signal $Y_R$ to the speaker 92R.

The suppression amount setting part 203R which performs processing different from that in the first embodiment will be described.

<Suppression Amount Setting Part 203R>

Figure 10:
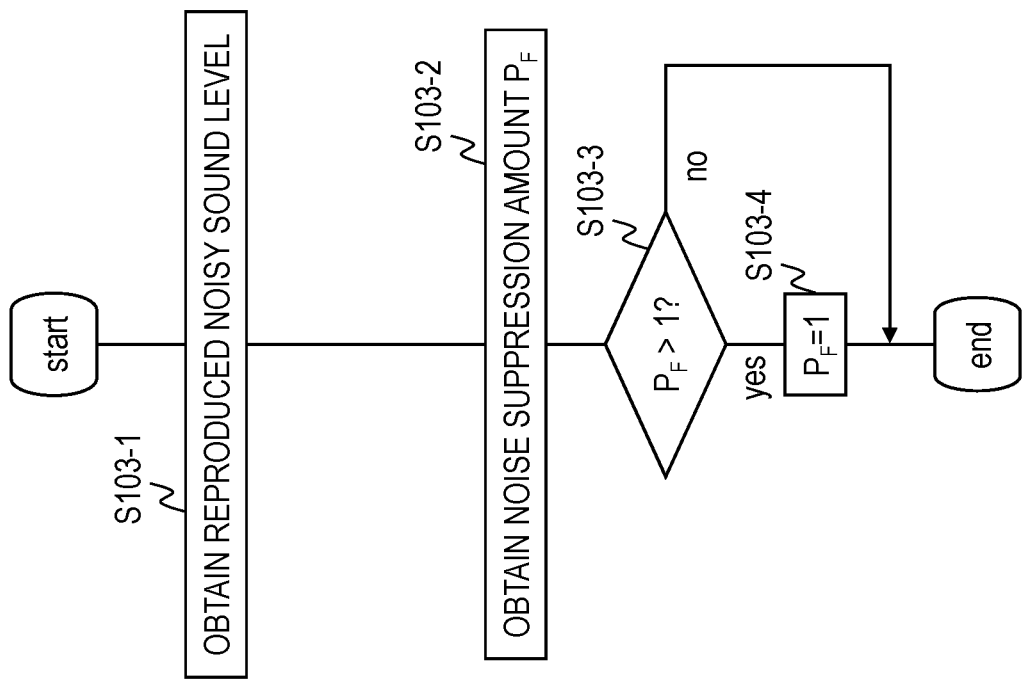
FIG. 10 is a view illustrating an example of processing flow of a suppression amount setting part according to the second embodiment.

The suppression amount setting part 203R receives input of a noise level $N_F(\omega, n)$. The suppression amount setting part 203R performs the following processing to obtain a noise suppression amount $P_F$ (S203R) and outputs the noise suppression amount $P_F$. FIG. 10 illustrates an example of processing flow of the suppression amount setting part 203R.

(1) The suppression amount setting part 203R obtains a reproduced noisy sound level, which is an estimated value of a magnitude of noise at a position of a passenger on the back seat in a case where the noise level $N_F(\omega, n)$ is reproduced from the speaker 92R using a method similar to that in the first embodiment (S203-1).

(2) The suppression amount setting part 203R obtains the noise suppression amount $P_F$ so that a product of the reproduced noisy sound level and the noise suppression amount $P_F$ becomes a constant C set in advance (S203-2). In other words, the suppression amount setting part 203R obtains the noise suppression amount $P_F$ using the following expression.

$$P_F = C/\text{reproduced noisy sound level}$$

Note that the constant C is a reproduced noisy sound level at which noise is assumed to be not perceived at the listening position. A minimum noisy sound level assumed at the listening position is obtained by multiplying the noisy sound level on the microphone side by an assumed noisy sound level difference while an assumed magnitude of a difference in a noisy sound level between the front seat and the back seat is taken into account, and a reproduced noisy sound level at which noise is not perceived under the noisy sound is set as C.

(3) In a case where $P_F$ is greater than 1 (S203-3), noise suppression is not required, and thus, $P_F$ is set at 1 (S203-4).

<Effects>

Such a configuration enables the noise suppression amount $P_F$ to be greater as the reproduced noisy sound level is greater, so that it is possible to provide effects similar to those provided in the first embodiment.

Modified Examples

Figure 11:
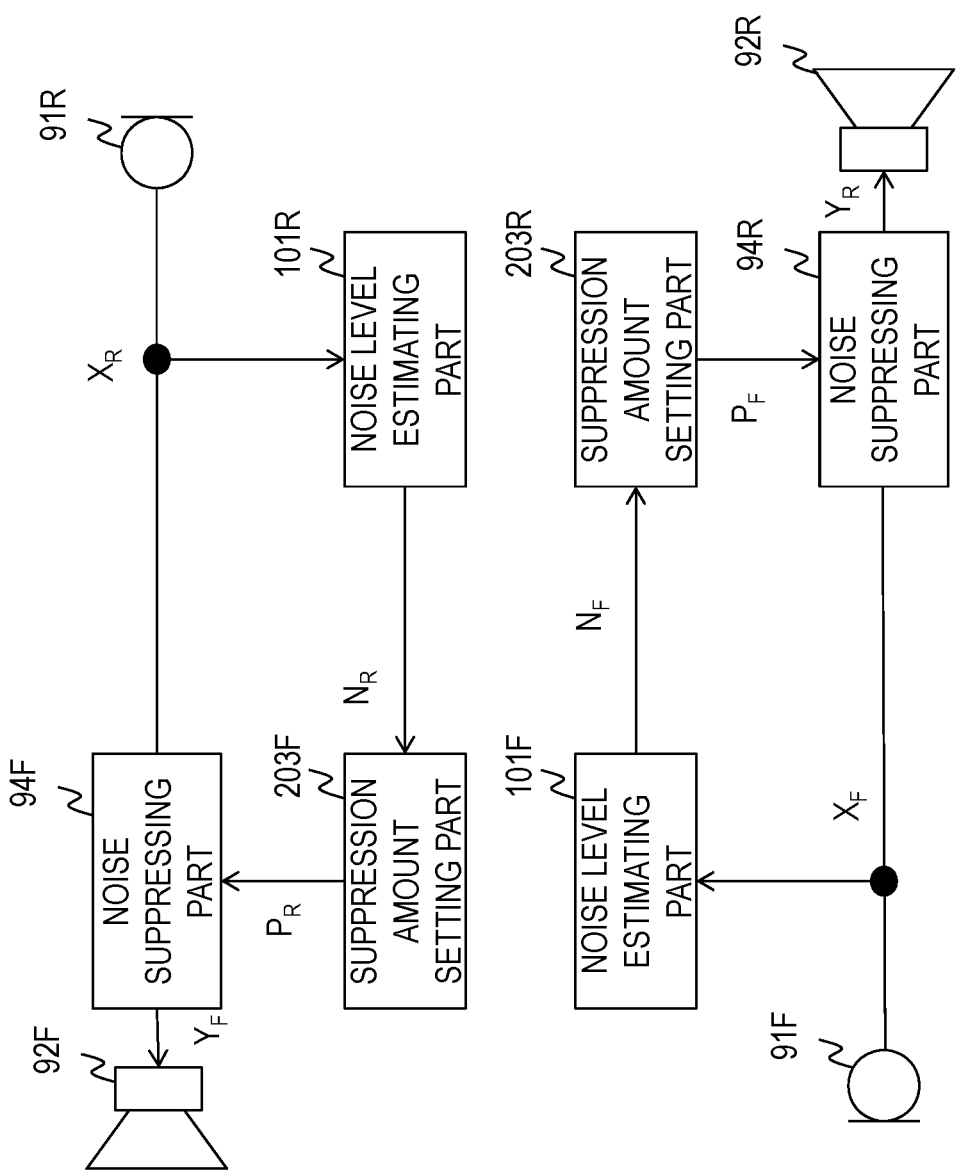
FIG. 11 is a functional block diagram of a sound collection loudspeaker apparatus according to a modified example of the second embodiment.

Note that, while, in the present embodiment, unidirectional sound collection and amplification processing is performed, the sound collection and amplification processing of the present embodiment can be also applied to bidirectional processing. For example, FIG. 11 illustrates a functional block diagram of the sound collection loudspeaker apparatus in a case where bidirectional sound collection and amplification processing is performed. Description will be omitted because the processing is the same except a direction.

Third Embodiment

Portions different from the first embodiment will be mainly described.

In the present embodiment, the noise level is estimated from information which correlates with a magnitude of noise inside the vehicle instead of being estimated from the sound collection signal.

The information which correlates with the magnitude of the noise inside the vehicle includes, for example, (i) a reproduction volume of the in-vehicle acoustic apparatus (car audio) mounted on the vehicle, (ii) a setting value (such as an air volume, a direction of wind, an actual temperature inside the vehicle and a set temperature) of air-conditioning equipment (air conditioner) mounted on the vehicle, (iii) traveling speed of the vehicle, and the like.

Relationship between the information which correlates with the magnitude of the noise inside the vehicle and the noisy sound levels on the microphone side and on the speaker side is obtained in advance, and then, the noisy sound levels on the microphone side and on the speaker side are estimated.

Figure 12:
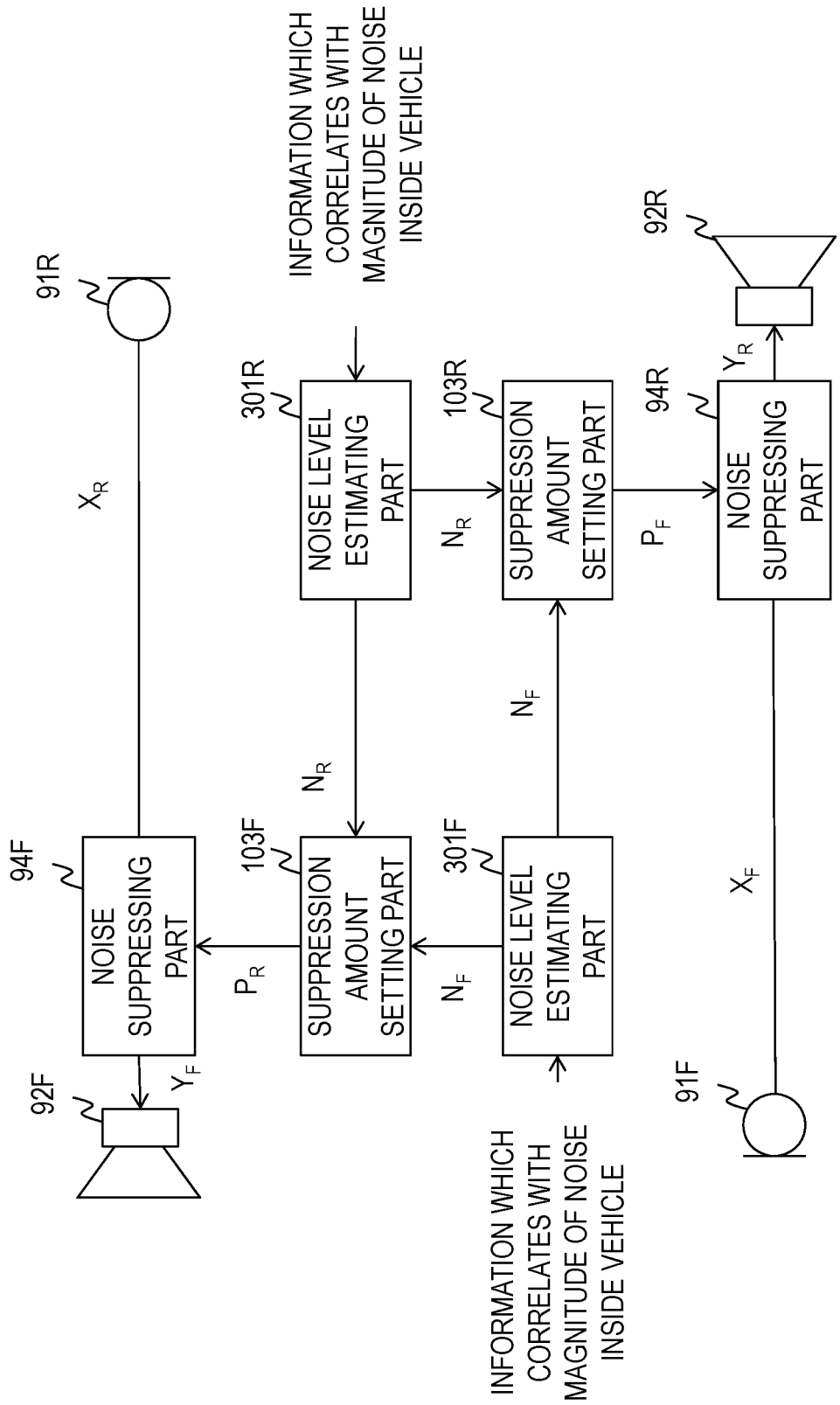
FIG. 12 is a functional block diagram of a sound collection loudspeaker apparatus according to a third embodiment.
Figure 13:
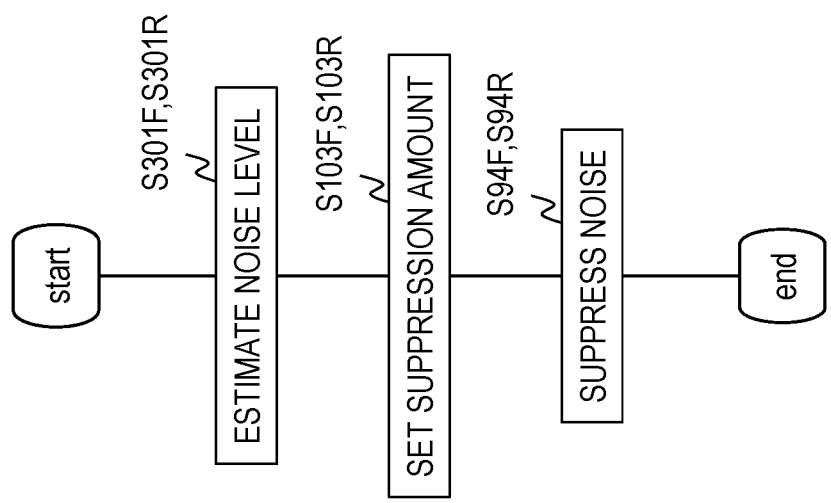
FIG. 13 is a view illustrating an example of processing flow of the sound collection loudspeaker apparatus according to the third embodiment.

FIG. 12 illustrates a functional block diagram of the sound collection loudspeaker apparatus according to the third embodiment, and FIG. 13 illustrates processing flow of the sound collection loudspeaker apparatus.

The sound collection loudspeaker apparatus includes noise level estimating parts 301F and 301R, suppression amount setting parts 103F and 103R, and noise suppressing parts 94F and 94R.

The sound collection loudspeaker apparatus receives input of the information which correlates with the magnitude of the noise inside the vehicle and the sound collection signals $X_F$ and $X_R$ obtained from the microphones 91F and 91R, suppresses noise components included in the sound collection signals $X_F$ and $X_R$ to generate reproduction signals $Y_R$ and $Y_F$ and outputs the reproduction signals $Y_R$ and $Y_F$ to the speakers 92R and 92F.

The noise level estimating parts 301F and 301R which perform processing different from that in the first embodiment will be described.

<Noise Level Estimating Parts 301F and 301R>

The noise level estimating part 301F receives input of the information which correlates with the magnitude of the noise inside the vehicle, obtains a noise level $N_F$ which is an estimated value of a magnitude of a noise component included in the sound collection signal $X_F$ (S301F) and outputs the noise level $N_F$.

For example, a signal corresponding to noise is reproduced from a speaker of the in-vehicle acoustic apparatus (car audio) at respective volumes and collected with the microphones 91F and 91R. The volumes of the sound collection signal are set as magnitudes of noise components corresponding to the reproduction volumes of the in-vehicle acoustic apparatus, and the respective volumes of the speaker and the volumes of the sound collection signal are stored in a storage part which is not illustrated in association with each other.

In a similar manner, the air-conditioning equipment (air conditioner) mounted on the vehicle is caused to operate at respective setting values of the air-conditioning equipment, and operation sound is collected with the microphones 91F and 91R. The volumes of the sound collection signal are set as magnitudes of noise components corresponding to the respective setting values of the air-conditioning equipment (air conditioner), and the respective setting values of the air-conditioning equipment (air conditioner) and the volumes of the sound collection signal are stored in a storage part which is not illustrated in association with each other.

Further, the vehicle is caused to travel at respective kinds of traveling speed, and driving sound is collected with the microphones 91F and 91R. The volumes of the sound collection signals are set as magnitudes of noise components corresponding to the respective kinds of traveling speed of the vehicle, and the respective kinds of traveling speed of the vehicle and the volumes of the sound collection signal are stored in a storage part which is not illustrated in association with each other.

The noise level estimating part 301F which receives the information which correlates with the magnitude of the noise inside the vehicle, takes the corresponding volumes of the sound collection signal (collected with the microphone 91F) from the storage part which is not illustrated and obtains a sum of the volumes as the noise level $N_F$.

Note that it is also possible to collect sound with the microphones 92F and 92R for each combination of respective volumes from the speaker of the in-vehicle acoustic apparatus (car audio), respective setting values of the air-conditioning equipment (air conditioner), and respective kinds of traveling speed of the vehicle (hereinafter, also referred to as combinations of noise sources), set volumes of the sound collection signal as magnitudes of noise components corresponding to respective combinations of noise sources, store the respective combinations of noise sources and the volumes of the sound collection signal in a storage part which is not illustrated in association with each other, and the noise level estimating part 301F which receives the information which correlates with the magnitude of the noise inside the vehicle, may take the corresponding volume of the sound collection signal (collected with the microphone 91F) from the storage part which is not illustrated, and may use the volume as is as the noise level $N_F$. While this configuration has an advantage that processing of calculating a sum can be omitted, this configuration has a disadvantage that types of data increase, which makes data collection complicated and increases search targets.

In a similar manner, the noise level estimating part 301R receives input of the information which correlates with the magnitude of the noise inside the vehicle, obtains a noise level $N_R(\omega, n)$ which is an estimated value of a magnitude of a noise component included in the sound collection signal $X_R$ (S301R) and outputs the noise level $N_R(\omega, n)$.

Other processing is similar to that in the first embodiment, and thus description will be omitted.

<Effects>

Such a configuration provides effects similar to those provided in the first embodiment.

Note that, while the present embodiment has been described using three types of information of (i) the reproduction volume of the in-vehicle acoustic apparatus (car audio) mounted on the vehicle, (ii) the setting value (such as an air volume, a direction of wind, an actual temperature inside the vehicle and a set temperature) of air-conditioning equipment (air conditioner) mounted on the vehicle, and (iii) the traveling speed of the vehicle, as examples of the information which correlates with the magnitude of the noise inside the vehicle, it is only necessary to use at least one of them as the information which correlates with the magnitude of the noise inside the vehicle. Further, it is also possible to use other information which correlates with the magnitude of the noise inside the vehicle.

Modified Examples

Figure 14:
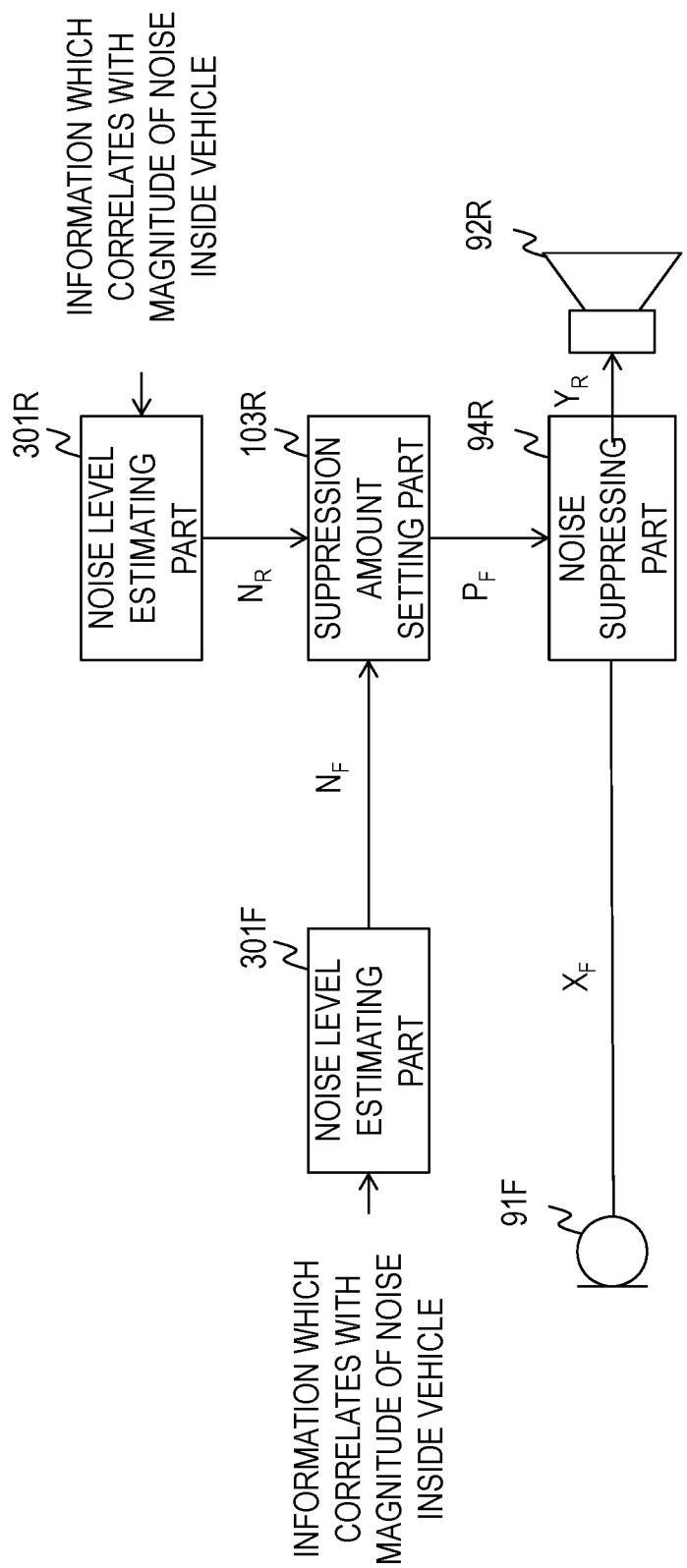
FIG. 14 is a functional block diagram of a sound collection loudspeaker apparatus according to combination of the third embodiment and the modified example of the first embodiment.
Figure 15:
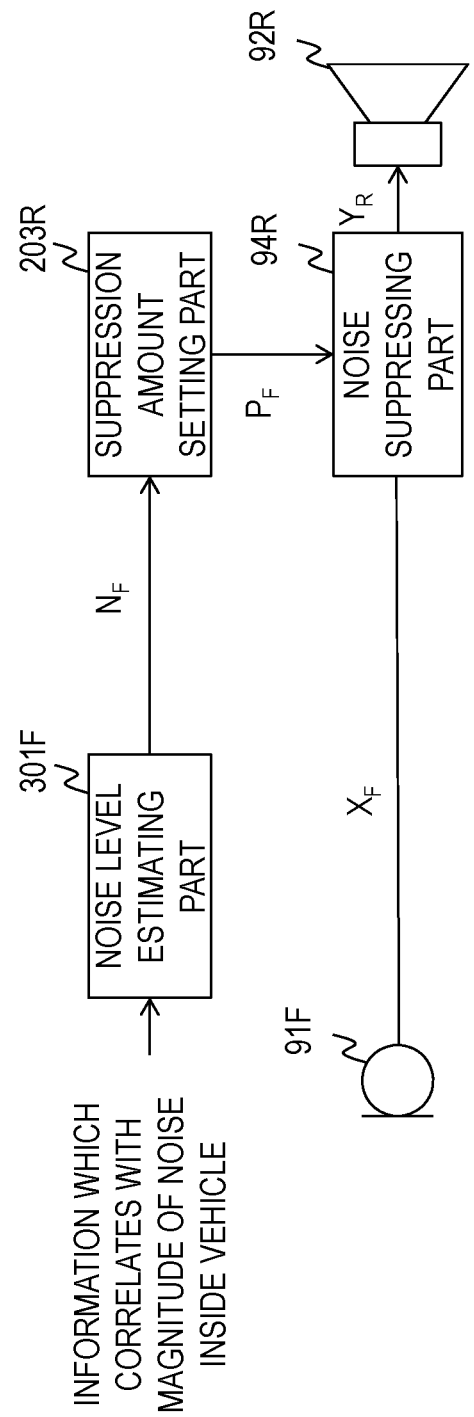
FIG. 15 is a functional block diagram of a sound collection loudspeaker apparatus according to combination of the third embodiment and the second embodiment.

Note that the present embodiment may be combined with the modified example of the first embodiment or the second embodiment. FIG. 14 illustrates a functional block diagram in a case where the present embodiment is combined with the modified example of the first embodiment, and FIG. 15 illustrates a functional block diagram in a case where the present embodiment is combined with the second embodiment.

Other Modified Examples

The present invention is not limited to the above-described embodiments and modified examples. For example, the above-described various kinds of processing may be executed in parallel or individually in accordance with processing performance of apparatuses which execute the processing or as necessary as well as being executed in chronological order in accordance with description. In addition, the present invention can be changed as appropriate within the scope not deviating from the gist of the present invention.

<Program and Recording Medium>

Further, various kinds of processing functions at the respective apparatuses described in the above-described embodiments and modified examples may be implemented with a computer. In this case, processing of functions to be performed by the respective apparatuses is described with a program. The above-described various kinds of processing functions at the respective apparatuses are implemented on the computer by this program being executed on the computer.

The program which describes details of the processing can be recorded in a computer-readable recording medium. Examples of the computer-readable recording medium can include, for example, a magnetic recording apparatus, an optical disk, a magnetooptical recording medium and a semiconductor memory.

Further, this program is distributed by, for example, a portable recording medium such as a DVD and a CD-ROM in which the program is recorded being sold, given, lent, or the like. Still further, it is also possible to distribute this program by storing the program in a storage apparatus of a server computer and transferring the program from the server computer to other computers via a network.

A computer which executes such a program, for example, first, stores a program recorded in the portable recording medium or a program transferred from the server computer in a storage part of the own computer once. Then, upon execution of the processing, this computer reads the program stored in the storage part of the own computer and executes the processing in accordance with the read program. Further, as another execution form of this program, the computer may directly read a program from the portable recording medium and execute the processing in accordance with the program. Still further, the computer may sequentially execute the processing in accordance with the received program every time the program is transferred from the server computer to this computer. Further, it is also possible to employ a configuration where the above-described processing is executed by so-called application service provider (ASP) service which implements processing functions only by an instruction of execution and acquisition of a result without the program being transferred from the server computer to this computer. Note that, it is assumed that the program includes information which is to be used for processing by an electronic computer, and which is equivalent to a program (not a direct command to the computer, but data, or the like, having property specifying processing of the computer).

Further, while the respective apparatuses are constituted by a predetermined program being executed on the computer, at least part of the processing content may be implemented with hardware.

What is claimed is:

1. A sound collection loudspeaker apparatus mounted on a vehicle in which at least a first sound collection and amplification position and a second sound collection and amplification position is assumed to be located inside the vehicle, the sound collection loudspeaker apparatus comprising:

processing circuitry configured to:
obtain a first noise level which is an estimated value of a magnitude of a noise component included in a first sound collection signal obtained from a first microphone which collects sound emitted from the first sound collection and amplification position;
obtain a second noise level which is an estimated value of a magnitude of a noise component included in a second sound collection signal obtained from a second microphone which collects sound emitted from the second sound collection and amplification position;
obtain a ratio of a reproduced noisy sound level, which is an estimated value of a magnitude of noise at a position of a passenger at the second sound collection and amplification position in a case where the first noise level is reproduced from a second speaker placed at the second sound collection and amplification position, to a second noisy sound level, which is an estimated value of a magnitude of noise corresponding to the second noise level at the position of the passenger at the second sound collection and amplification position, obtain a noise suppression amount such that a product of the ratio and the noise suppression amount equals a predetermined constant, and set the noise suppression amount at 1 in a case where the noise suppression amount is greater than 1; and
multiply the first sound collection signal by the noise suppression amount and output a multiplication result to the second speaker placed at the second sound collection and amplification position, wherein
the reproduced noisy sound level is obtained by multiplying the first noise level by a constant obtained in advance, and the second noisy sound level is obtained by multiplying the second noise level by a constant obtained in advance.

2. A sound collection loudspeaker apparatus mounted on a vehicle in which at least a first sound collection and amplification position and a second sound collection and amplification position are assumed to be located inside the vehicle, the sound collection loudspeaker apparatus comprising:

processing circuitry configured to:
obtain a first noise level which is an estimated value of a magnitude of a noise component included in a first sound collection signal obtained from a first microphone which collects sound emitted from the first sound collection and amplification position;
obtain a noise suppression amount such that a product of a reproduced noisy sound level and the noise suppression amount equals a predetermined constant, and set the noise suppression amount at 1 in a case where the noise suppression amount is greater than 1, the reproduced noisy sound level being an estimated value of a magnitude of noise at a position of a passenger at the second sound collection and amplification position in a case where the first noise level is reproduced from a second speaker placed at the second sound collection and amplification position; and
multiply the first sound collection signal by the noise suppression amount and output a multiplication result to the second speaker placed at the second sound collection and amplification position.

3. A sound collection loudspeaker apparatus mounted on a vehicle in which at least a first sound collection and amplification position and a second sound collection and amplification position are assumed to be located inside the vehicle, the sound collection loudspeaker apparatus comprising:

processing circuitry configured to:
obtain a first noise level, which is an estimated value of a magnitude of a noise component included in a first sound collection signal obtained from a first microphone which collects sound emitted from the first sound collection and amplification position, from at least one of
(i) a volume of an in-vehicle acoustic apparatus mounted on the vehicle,
(ii) a setting value of air-conditioning equipment mounted on the vehicle, or
(iii) traveling speed of the vehicle;
obtain a second noise level, which is an estimated value of a magnitude of a noise component included in a second sound collection signal obtained from a second microphone which collects sound emitted from the second sound collection and amplification position, from at least one of
(i) the volume of the in-vehicle acoustic apparatus mounted on the vehicle,
(ii) the setting value of the air-conditioning equipment mounted on the vehicle, or
(iii) the traveling speed of the vehicle;
obtain a ratio of a reproduced noisy sound level, which is an estimated value of a magnitude of noise at a position of a passenger at the second sound collection and amplification position in a case where the first noise level is reproduced from a second speaker placed at the second sound collection and amplification position, to a second noisy sound level, which is an estimated value of a magnitude of noise corresponding to the second noise level at the position of the passenger at the second sound collection and amplification position, obtain a noise suppression amount such that a product of the ratio and the noise suppression amount equals a predetermined constant, and set the noise suppression amount at 1 in a case where the noise suppression amount is greater than 1; and
multiply the first sound collection signal by the noise suppression amount and output a multiplication result to the second speaker placed at the second sound collection and amplification position, wherein
the reproduced noisy sound level is obtained by multiplying the first noise level by a constant obtained in advance, and the second noisy sound level is obtained by multiplying the second noise level by a constant obtained in advance,
a magnitude of a noise component in the first sound collection and amplification position, a magnitude of a noise component in the second sound collection and amplification position, and at least one of (i) a volume of the in-vehicle acoustic apparatus mounted on the vehicle, (ii) a setting value of the air-conditioning equipment mounted on the vehicle, or (iii) traveling speed of the vehicle are stored in a storage part in advance in association with each other, and the processing circuitry receives as input at least one of (i) the volume of the in-vehicle acoustic apparatus mounted on the vehicle, (ii) the setting value of the air-conditioning equipment mounted on the vehicle, or (iii) the traveling speed of the vehicle, and takes from the storage part the magnitude of the noise component in the first sound collection and amplification position corresponding to the input as the first noise level, and the magnitude of the noise component in the second sound collection and amplification position corresponding to the input as the second noise level.

4. A non-transitory computer-readable recording medium on which a program for causing a computer to function as the sound collection loudspeaker apparatus according to any one of claims 1 to 3.

* * * * *